(No Model.)
J. C. NEWBERY & C. T. J. VAUTIN.
PROCESS OF AND APPARATUS FOR THE SEPARATION OF FINELY DIVIDED MINERAL OR METALLIC MATTER FROM THE LIQUIDS IN WHICH THEY ARE SUSPENDED.
No. 439,173. Patented Oct. 28, 1890.
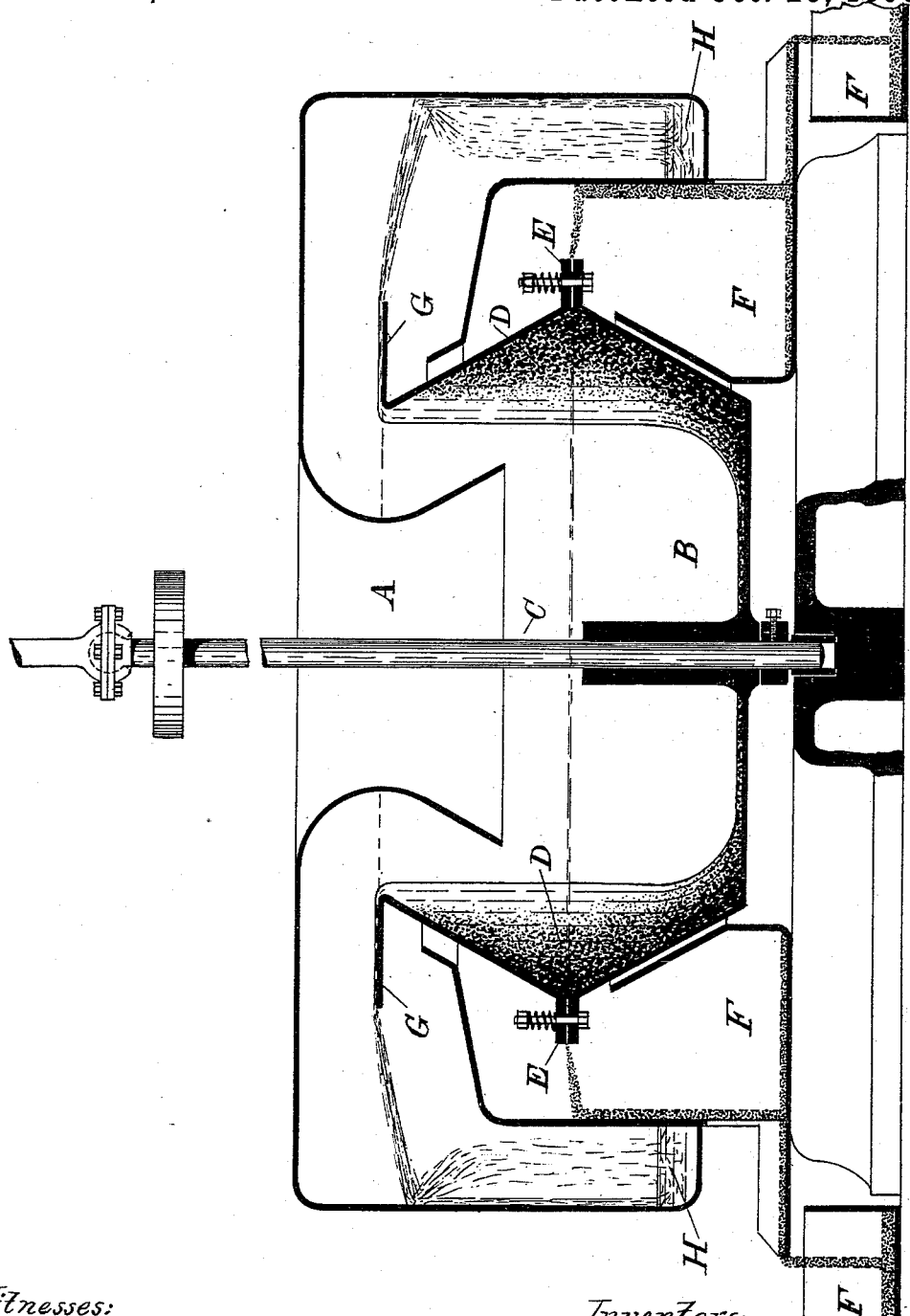
Witnesses:
Inventors:
James Cosmo Newbery
Claude Theodore James Vautin
By Richards
Attorneys,
THE NORRIS PETERS CO., PHOTO-LITHO., WASHINGTON, D. C.

UNITED STATES PATENT OFFICE.

JAMES COSMO NEWBERY, OF MELBOURNE, VICTORIA, AND CLAUDE THEODORE JAMES VAUTIN, OF LONDON, ENGLAND.

PROCESS OF AND APPARATUS FOR THE SEPARATION OF FINELY-DIVIDED MINERAL OR METALLIC MATTERS FROM THE LIQUIDS IN WHICH THEY ARE SUSPENDED.

SPECIFICATION forming part of Letters Patent No. 439,173, dated October 28, 1890.

Application filed December 20, 1888. Serial No. 294,185. (No model.)

*To all whom it may concern:*

Be it known that we, JAMES COSMO NEWBERY, of Melbourne, in the Colony of Victoria, temporarily of London, England, and CLAUDE THEODORE JAMES VAUTIN, of London, England, subjects of Her Majesty the Queen of Great Britain and Ireland, have invented an Improved Process of and Apparatus for the Separation of Finely-Divided Natural Mineral or Metallic Matters from the Liquids in which they are Suspended, of which the following is a specification.

Our invention relates to any process in which it may be desired to separate natural mineral or metallic matter other than gold from the liquid in which they may be suspended—such, for instance, as in a fine clay process, in which the finest particles of clay have to be separated from the water in which they are suspended, or as in other processes in which a solution containing a valuable metallic salt or the metallic particles has to be separated from the finely-ground ore or débris with which it is intimately mixed.

Now our invention is designed to dispense with the use of ordinary settling-tanks or reservoirs or filtration for such purposes by the substitution of a modified centrifugal apparatus running at high speed, by which the separation in strata of various mixed substances is effected in the order of their respective densities.

Our invention therefore dispenses with the use of the present known filters, either stationary or centrifugal, which are, in the processes specified, subject to the serious disadvantage that either the filtering medium is not fine enough to strain out the finest particles of solid mineral matter mixed with or carried in suspension in the liquid or if the filtering medium be made sufficiently fine to effect this it rapidly chokes and its filtering action ceases. Our process therefore is effected as follows: Should we have a process for the collection of the finest clay which by washing is carried in suspension in water, and it is desired to collect the fine clay and to separate the liquid in a clear condition and as quickly as possible, we feed the mixed clay and liquid through a supply-pipe into a centrifugal separator, which is caused to revolve at a high speed. The centrifugal action thus developed in the mixture causes the particles of matter which are of greater density than the solution to press outward as far as possible to the periphery of the said centrifugal machine, and thus to pack and collect on the inside of the said periphery, leaving a clear solution between it and the central axis of the apparatus. This clear solution is then regularly withdrawn either by siphonage through a siphon-pipe or through a suitable opening and collected by external troughs about the periphery, while the constant supply of the mixture is similarly maintained through the aforesaid supply-pipe. As the solid matter accumulates at the periphery it is allowed to escape through a suitable opening in the top, bottom, or side of the periphery, so as to keep the apparatus in constant action; or, should the accumulation of solid matter become sufficiently great at the periphery, the centrifugal apparatus may be stopped from time to time and the more or less foul remains of the solution withdrawn by a special tap in the base of the trough or drum, and the accumulation of solid matter around the periphery may be removed by a suitable tool or spade. Similarly in a process for the collection of metallic particles other than gold, which is the subject-matter of another application of Claude Theodore James Vautin, of even date herewith, Serial No. 295,243, carried in suspension in water, the aforesaid process of separation instead of the present processes of filtration is particularly applicable and valuable.

The centrifugal apparatus above referred to may be arranged either horizontally or vertically, and the orifices of exit for the various parts of the mixtures when at the top, side, or bottom of the periphery may be regulated in position by sliding shutters or spring reaction, as desired; or the various parts of the mixture may be collected by adjustable pipes passing through the periphery of the machine and terminating in the respective zones of the separated substances or solutions, the said pipes being closed, if desired, at their extremities by spring-valves or by plugs. The delivered products from such pipes or orifices may be collected by troughs surrounding the rotating machine.

In order that our invention may be the better understood, we describe and illustrate herewith such a form of apparatus as will carry into effect the said process.

The mixed mineral substance and liquid is poured through the central orifice A into the centrifugal machine B, which is rotated at a high speed upon the axis C. The mixed mineral substance and liquid will by centrifugal action collect, as at D, at the periphery of the apparatus. The periphery of the apparatus may be provided with orifices controlled by shutters or with apertures controlled by spring-pressed valves, or may be divided by a joint E, controlled by spring-pressed bolts, as shown. The pressure of the solid matter of the mineral substance at the periphery will serve to force the two parts of the machine apart and to open the joint E against the spring reaction of the bolts, which may be readily adjusted to any desired pressure consequent upon the speed of revolution and the weight of mineral matter. This action will automatically release the semi-fluid solid mass through the said joint, which is then collected in the troughs F. As the solid matter will always occupy an exterior zone in the centrifugal machine and the liquid an interior zone, the supply of mixed material may be so regulated that the inner zone of liquid is discharged through a suitable opening or over the edge G of the apparatus, and may then be collected in the trough H.

It is obvious that many different forms of apparatus with escaping-apertures may be devised for the outflow of the semi-fluid sludge and of the liquid into respective collecting-troughs without departing from the essence of our improved process.

Having now particularly described and ascertained the nature of our said invention and in what manner the same is to be performed, we declare that what we claim is—

1. The herein-described method of separating finely-divided natural mineral or metallic substances from the liquid carrying them in suspension, which consists in dividing such mixture into annular strata by centrifugal force, causing an exit opening or openings to be formed in the containing-vessel by the centrifugal pressure of the substance, and in then drawing off or removing separately the matter forming each stratum, substantially as set forth.

2. A centrifugal separating apparatus comprising a revoluble drum having parts held together by yielding devices and adapted to be separated by the pressure of the material to form an exit-opening, substantially as set forth.

3. A centrifugal separating apparatus consisting of a revoluble drum B, the upper part of which is jointed to the lower part by spring-pressed bolts E, such joint and the top of the drum allowing the passage of the annular strata of the mixture at the position of the said joint and said top of the drum, respectively, into suitable chambers arranged to collect the said mixtures separately, substantially as set forth.

In testimony whereof we have signed our names to this specification in the presence of two subscribing witnesses.

JAMES COSMO NEWBERY.
CLAUDE THEODORE JAMES VAUTIN.

Witnesses:
ALBERT E. NASH,
RICHARD A. HOFFMANN.